US 6,617,726 B1

(12) United States Patent
Tsergas

(10) Patent No.: US 6,617,726 B1
(45) Date of Patent: Sep. 9, 2003

(54) MOTOR GEAR BOX

(75) Inventor: Athanase N. Tsergas, Wood Dale, IL (US)

(73) Assignee: Molon Motor & Coil Corporation, Rolling Meadows, IL (US)

( * ) Notice: Subject to any disclaimer, the term of this patent is extended or adjusted under 35 U.S.C. 154(b) by 0 days.

(21) Appl. No.: 10/136,325

(22) Filed: May 2, 2002

(51) Int. Cl.⁷ .............................. H02K 11/00; H02K 7/00
(52) U.S. Cl. ........................ 310/75 R; 310/83; 310/66; 310/40 R
(58) Field of Search ................. 310/40 R, 66, 310/75 R, 83

(56) References Cited

U.S. PATENT DOCUMENTS

| 3,679,958 A | * | 7/1972 | Chambers ................... 310/50 |
| 3,892,986 A | * | 7/1975 | Allen ......................... 310/42 |
| 3,894,255 A | * | 7/1975 | Newton, Jr. ................. 310/80 |
| 5,284,064 A | * | 2/1994 | Green et al. ................. 74/435 |
| 5,734,210 A | * | 3/1998 | Keutz ....................... 310/49 R |
| 5,877,570 A | * | 3/1999 | Chen ........................ 310/75 R |
| 6,054,785 A | * | 4/2000 | Kerdjoudj et al. .... 310/40 MM |
| 6,201,326 B1 | * | 3/2001 | Klappenbach et al. .... 310/75 R |
| 6,204,585 B1 | * | 3/2001 | Riello et al. ................ 310/159 |
| D440,995 S | | 4/2001 | Tsergas et al. |
| 6,229,233 B1 | * | 5/2001 | Torii et al. ................ 310/75 R |
| 6,364,850 B1 | * | 4/2002 | Wang ......................... 601/98 |

FOREIGN PATENT DOCUMENTS

| JP | 10327554 A | * | 12/1998 | ............ H02K/7/00 |
| JP | 2000177609 A | * | 6/2000 | ........... H02K/11/00 |
| JP | 2000316254 A | * | 11/2000 | ............ H02K/7/00 |

* cited by examiner

Primary Examiner—Thomas M. Dougherty
Assistant Examiner—Jaydi Aguirrechea
(74) Attorney, Agent, or Firm—Oblon, Spivak, McClelland, Maier & Neustadt, P.C.

(57) ABSTRACT

A motor gear box has a direct current motor, a first bevel gear, a second bevel gear, a pinion transfer gear, at least one cluster gear, an output gear, an output shaft, and a collar abutting against the output gear and surrounding the output shaft. The motor gear box also includes a frame formed integrally with the collar, a first cover to protect the motor, and a second cover having a cradle formed integrally therein. The output shaft has at one end a stepped down shaft portion held in the cradle and at an opposite end a hollow internal chamber formed to receive a protuberance of a device requiring the delivery of high torque to carry out a task in a small space. A programmable control board is attached to one side of the motor; an electrode tip is arranged on a top of the motor; a lead harness assembly is secured around the electrode tip; and an L-shaped connection rod links the lead harness assembly to the control board to conserve space.

7 Claims, 4 Drawing Sheets

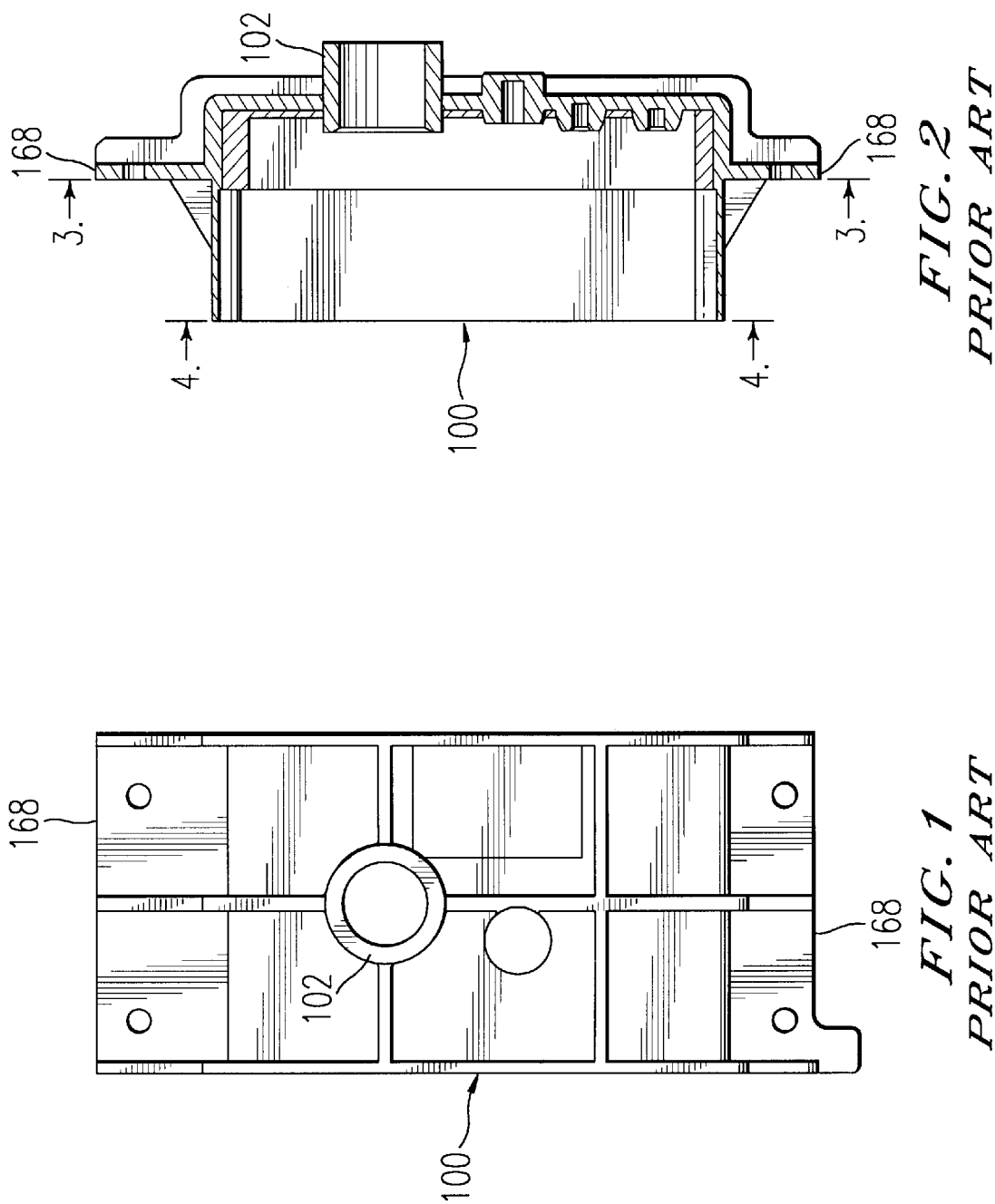

MOTOR GEAR BOX

BACKGROUND OF THE INVENTION

1. Field of the Invention

This invention relates to machine elements and mechanisms generally, but more particularly to motor gear boxes.

2. Description of the Related Art

The present invention is an improvement upon the compact miniature motor gear box shown in U.S. Pat. No. 6,054,785 which was issued on Apr. 25, 2000, to Kerdjoudj et al. and in U.S. Design Pat. No. D440,995 which was issued on Apr. 24, 2001, to Tsergas et al.

FIG. 1 shows a bottom plan view of a prior art motor gear box 100 with built-in mounting brackets 168 at each end. A separate sleeve 102 surrounds an output shaft (not shown) that protrudes from the gear box 100.

FIG. 2 shows a cross-sectional side elevational view of the prior art motor gear box 100 with the built-in mounting brackets 168 at each end and the separate sleeve 102 which surrounds the output shaft (not shown) that protrudes from the gear box 100.

FIG. 3 shows a cutaway top plan view taken along line 3—3 of FIG. 2 showing the prior art motor gear box 100 with the separate sleeve 102 and other sleeves 104, 106 and 108 interconnected by reinforcing ribs 103, 105 and 107, respectively. These other sleeves 104, 106 and 108 surround other gear shafts (not shown). Other reinforcing ribs 109, 111, 112 and 113 provide rigidity to a frame 114 which surrounds the sleeves and ribs mentioned above.

FIG. 4 shows another cutaway top plan view taken along line 4—4 of FIG. 2 showing the prior art motor gear box 100 with the frame 114 surrounding a direct current (DC) motor 110. A programmable control board (PCB) 122 is mounted on a rear end 130 of the DC motor 110 while a first-stage worm gear 132 protrudes from a front end 120 of the DC motor 110. This first-stage worm gear 132 meshes with a double pinion transfer gear 134.

SUMMARY OF THE INVENTION

The present invention relates to a gear box housing a motor capable of delivering a high torque sufficient to crush ice in a refrigerator ice maker.

This arrangement keeps the motor compact inside the gear box which makes efficient use of space in a refrigerator and any other appliance requiring the application of high torque in a small space.

A number of features support quiet operation for this subfractional horsepower motor inside the gear box of the present invention.

A primary object of the present invention is to provide a lead harness assembly and a connection for linking an electrode tip at one end of a direct current (DC) motor to a programmable control board (PCB) mounted on a side of the DC motor to conserve space.

A secondary object of the present invention is to provide two bevel gears which are stronger than a single worm gear for meshing with each other and for transmitting more power from the DC motor to an output shaft.

A tertiary object of the present invention is to provide a collar formed integrally with the frame so that a stronger output shaft may protrude therefrom. Such a stronger output shaft is capable of applying higher torque than a conventional shaft to a task requiring great strength, such as crushing ice cubes and chips inside a refrigerator ice maker.

These and other objects of the present invention will be better understood by reference to the following drawings and the subsequent detailed description when considered together.

BRIEF DESCRIPTION OF THE DRAWINGS

FIG. 1 shows a bottom plan view of a prior art motor gear box.

FIG. 2 shows a cross-sectional side elevational view of the prior art motor gear box.

DETAILED DESCRIPTION OF THE INVENTION

Figure 4:
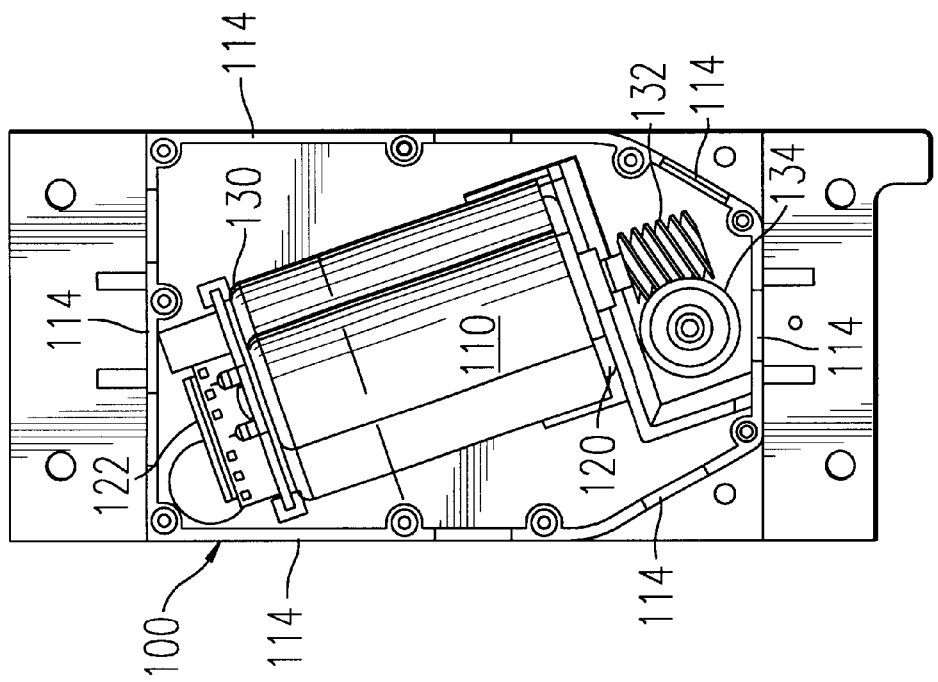
FIG. 4 shows a top plan view taken along line 4—4 of FIG. 2.
Figure 3:
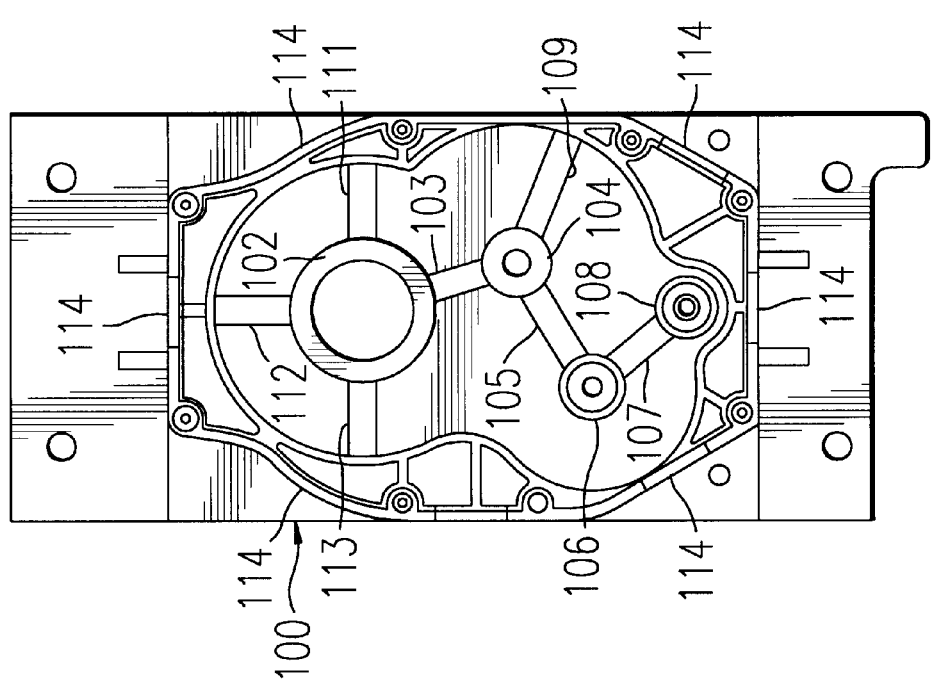
FIG. 3 shows a top plan view taken along line 3—3 of FIG. 2.

Like reference numerals designate identical or corresponding parts throughout the several views of the drawings. Features of the invention will become apparent in the course of the following description of a preferred embodiment which is given only for illustration of the invention and which is not intended to be limiting thereof.

Figure 5:
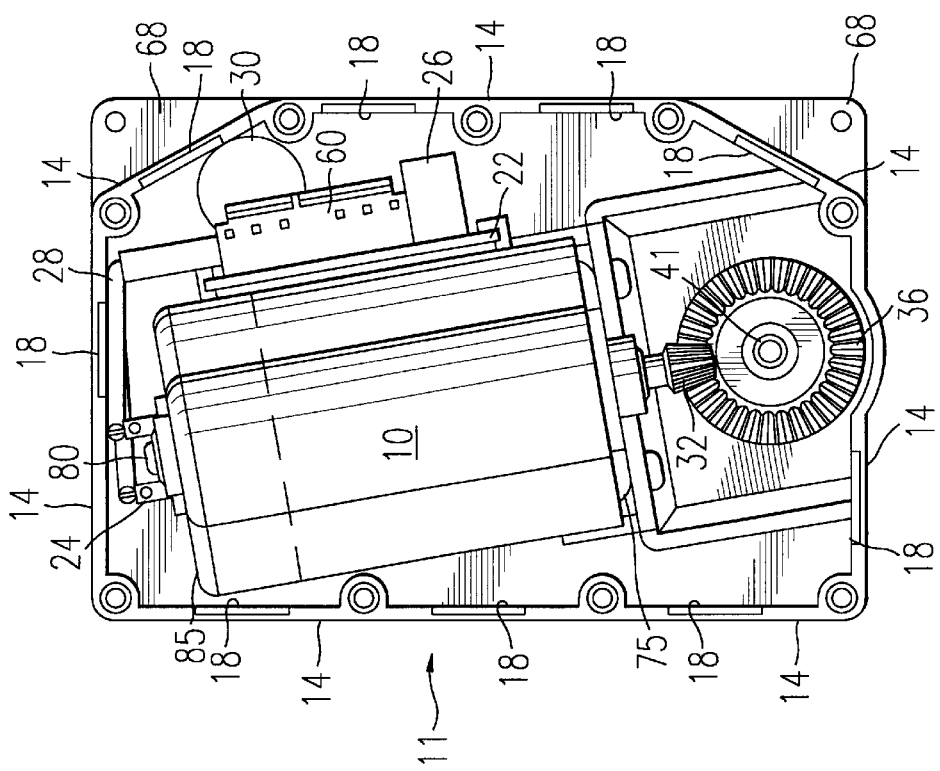
FIG. 5 shows a cutaway top plan view of the present invention.

In FIG. 5, a DC motor 10 is attached inside a gear box 11 having a frame 14 surrounding the motor 10. A plurality of straight side tabs 18 interlock the frame 14 to a first cover (not shown in FIG. 5) which protects the motor 10 inside the gear box 11. A programmable control board (PCB) 22 is attached to one side of the motor 10 to conserve space. Attachment to a top 75, a bottom 85, or another side of the motor 10 would require the gear box 11 to be made larger in order to accommodate the motor 10 in its illustrated position at an angle with the PCB 22 attached thereto.

A lead harness assembly 24 is secured around an electrode tip 80 arranged on the top 75 of the motor 10 and links the electrode tip 80 at the top 75 of the motor 10 via an L-shaped connection rod 28 to the PCB 22 mounted on one side of the motor 10.

The gear box 11 has a pair of triangular corner feet 68 which allow the entire unit to be mounted to the device being operated.

The PCB 22 has attached thereto an electrolytic capacitor 26 for filtering constant direct current, a plurality of diodes (not shown) forming a full-wave bridge, and a motor fuse 30 which is preferably a positive temperature coefficient (PTC) resistor.

Alternating current (AC) voltage enters the PCB 22 at one end and is received by a header 60 mounted on the PCB 22 before exiting to energize the motor 10. After leaving the header 60, the AC voltage passes through the plurality of diodes (not shown) which form a full-wave bridge to rectify the AC voltage. After leaving the plurality of diodes (not shown), the voltage is processed by the capacitor 26 which is mounted to the PCB 22 and which filters for constant direct current. The voltage then goes through the PTC resistor which is also mounted to the PCB 22 and which functions as the motor fuse 30 to prevent overloads. The voltage passes again through the header 60 before reaching a switch (not shown) for reversing the current back through the header 60 and out to the motor 10. The reversing switch (not shown) is mounted outside the PCB 22 to a second cover (also not shown in FIG. 5).

A small first bevel gear 32 is driven directly by the motor 10 at the bottom 85 opposite from the electrode tip 80. This small driving first bevel gear 32 meshes with a large driven second bevel gear 36 having a longitudinal shaft 41.

Figure 6:
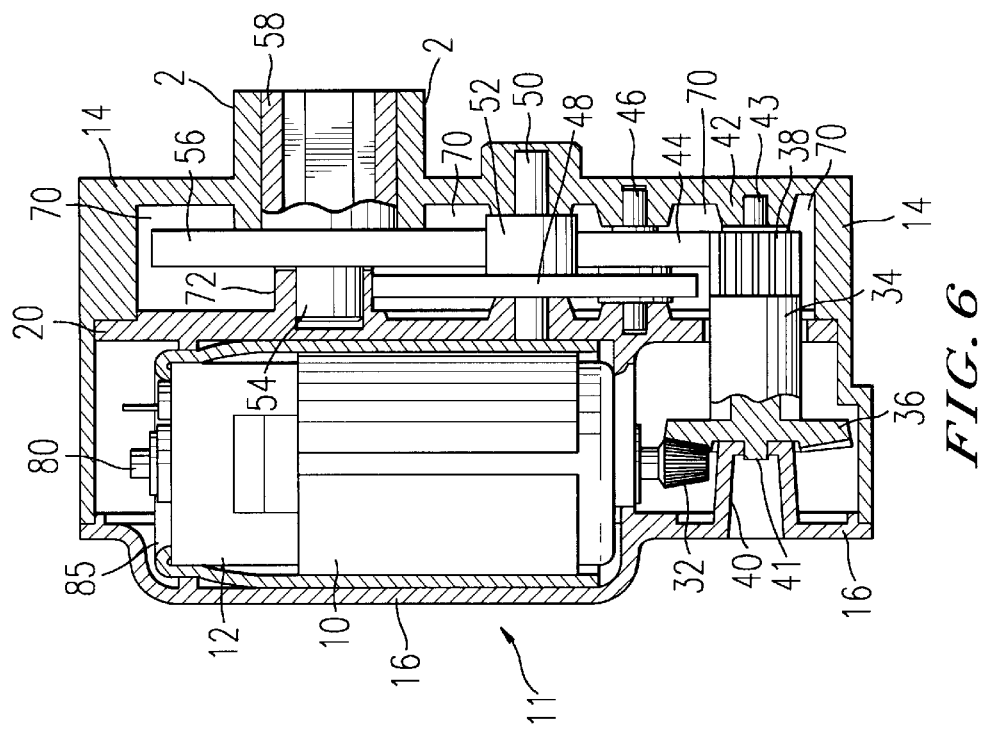
FIG. 6 shows a cross-sectional side elevational view of the present invention.

In FIG. 6, the motor 10 has a permanent magnet 12 attached thereto at the top 85 where the electrode tip 80 is located. This permanent magnet 12 produces an electromagnetic field necessary for operating the motor 10. A first cover 16 on an outer side protects the motor 10 inside the gear box 11. A second cover 20 is attached to the frame 14 and is located on an inner side of the motor 10 which is protected on the outer side by the first cover 16.

The driving first bevel gear 32 meshes with the driven second bevel gear 36 which, in turn, drives a pinion transfer gear 34 molded thereto at a right angle to one end thereof. At an opposite end of the transfer gear 34, teeth 38 are formed in a side thereof and change rotation from a right angle to a plurality of cluster gears which are aligned parallel to the driving first bevel gear 32. An internal trunnion 40 makes the driven second bevel gear 36 stable while another internal trunnion 42 makes the transfer gear 34 stable by extending therein and engaging longitudinal shafts 41 and 43, respectively, from opposite ends. The one trunnion 40 is molded at one end to the first cover 16 while the other trunnion 42 is molded at its opposite end to the frame 14.

The teeth 38 on the transfer gear 34 mesh at a right angle with a first cluster gear 44 which has a first gear pin 46 for stabilizing the first cluster gear 44 between the frame 14 and the second cover 20. In turn, the first cluster gear 44 drives a second cluster gear 48 which has a second gear pin 50 for likewise stabilizing the second cluster gear 48 between the frame 14 and the second cover 20. The second cluster gear 48 has a short shaft portion 52 with teeth (not shown) which engage on one side with the first cluster gear 44 and which engage on an opposite side with an output gear 56. This output gear 56 has on one side a stepped down shaft portion 54 that is held in a cradle 72 which is formed integrally with the second cover 20. This stepped down shaft portion 54 is formed integrally with the output shaft 58. Thus, the output gear 56 turns with an output shaft 58 which extends through a rigid collar 2 that is formed integrally with the frame 14. This collar 2 abuts against the output gear 56 and completely surrounds the output shaft 58 so that the output shaft 58 is stronger and is capable of applying higher torque than a conventional shaft to a task requiring great strength.

Thus, a gear train extends from the driving first bevel gear 32 to the driven second bevel gear 36 to the transfer gear 34 to the first cluster gear 44 to the second cluster gear 48 to the output gear 56 and is compact because it wraps tightly around the motor 10 in the shape of a capital letter J. Also, the gear train is contained between frame 14 and the second cover 20 inside the gear box 11.

Noise generated by the gear train is suppressed by grease packed in a plurality of acoustical chambers 70 which are formed between the frame 14 and the second cover 20.

The output shaft 58 drives a tool (not shown) for crushing ice inside a refrigerator door. This output shaft 58 may also be used to drive any other electromechanical unit requiring the application of high torque.

Figure 7C:
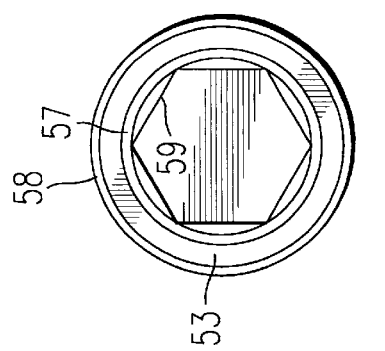
FIG. 7C is a top plan view of an output shaft taken along line 7C—7C of FIG. 7B.
Figure 7B:
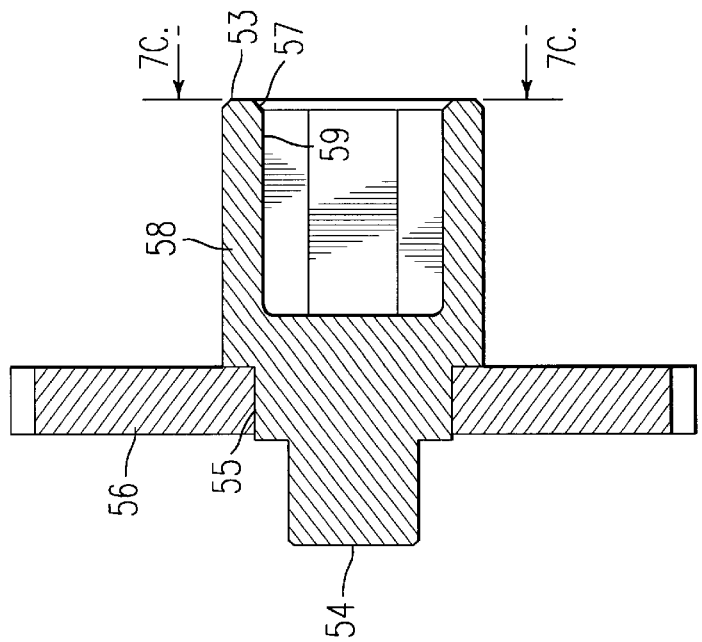
FIG. 7B is a cross-sectional view taken along line 7B—7B of FIG. 7A.
Figure 7A:
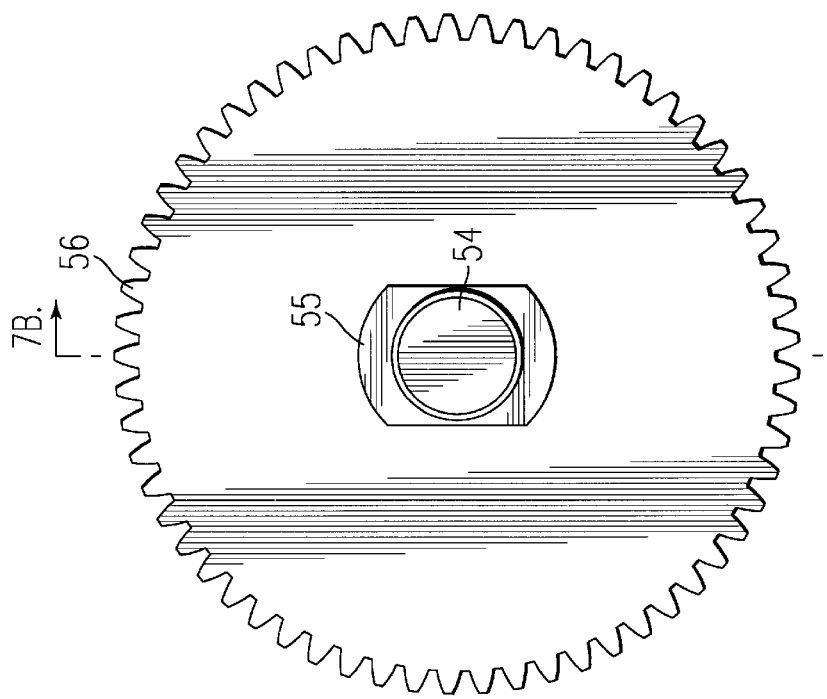
FIG. 7A shows a bottom plan view of an output gear of the present invention.

FIG. 7A shows a bottom plan view of the output gear 56 with the stepped down shaft portion 54 that is held in the cradle 72 seen in FIG. 6. In FIG. 7A, the output gear 56 is shown to be mounted onto an intermediate shaft portion 55.

FIG. 7B shows a cross-sectional view of the output gear 56 which is mounted on the intermediate shaft portion 55 of the output shaft 58. In regard to the output gear 56, the stepped down shaft portion 54 is located on one side and the output shaft 58 is located on an opposite side. Thus, the output shaft 58 engages at a right angle with the output gear 56. The output shaft 58 includes a hollow internal chamber 59 to receive a protuberance (not shown), such as a crank of an ice crushing device. A beveled interior edge 57 is formed on an outer face 53 of the shaft 58 and facilitates sliding entry of the protuberance (not shown) into the internal chamber 59 of the shaft 58.

FIG. 7C is a top plan view of the output shaft with a head on look at the hollow internal chamber 59 thereof. This chamber 59 has a hexagonal shape, but may also have a square shape, and is formed to receive the protuberance (not shown) which may be a hex-headed bolt. The beveled interior edge 57 has an annular shape between the chamber 59 and the outer face 53 of the shaft 58.

Numerous modifications and variations of the present invention are possible in light of the above teachings. Thus, it is to be understood that, within the scope of the appended claims, the invention may be practiced in ways other than as specifically described herein.

What is claimed is:

1. A motor gear box comprising:
   a DC motor with a permanent magnet attached thereto;
   a first bevel gear driven at one end by the DC motor;
   a second bevel gear driven by the first bevel gear;
   a pinion transfer gear molded at one end at a right angle to the second bevel gear;
   at least one cluster gear engaging at a right angle with an opposite end of the pinion transfer gear;
   an output gear driven by the at least one cluster gear;
   an output shaft engaging at a right angle with the output gear; and
   a collar abutting against the output gear and surrounding the output shaft.

2. A motor gear box, according to claim 1, further comprising:
   a programmable control board attached to one side of the DC motor;
   an electrode tip arranged on a top of the DC motor;
   a lead harness assembly secured around the electrode tip; and
   an L-shaped connection rod configured to link the lead harness assembly to the programmable control board.

3. A motor gear box, according to claim 1, wherein:
   said output gear is mounted on an intermediate shaft portion of the output shaft.

4. A motor gear box, according to claim 1, wherein:
   said output shaft includes an outer face, a hollow internal chamber, and a beveled interior edge configured to facilitate entry into the hollow internal chamber.

5. A motor gear box, according to claim 4, wherein:
   said hollow internal chamber has a hexagonal shape; and
   said beveled interior edge is formed on the outer face of the output shaft.

6. A motor gear box, according to claim 1, further comprising:
   a frame formed integrally with the collar;
   a first cover configured to protect the DC motor on an outer side thereof; and
   a second cover attached to the frame and located on an inner side of the DC motor.

7. A motor gear box, according to claim 6, wherein:
   said second cover has a cradle formed integrally thereon; and
   said output shaft has a stepped down shaft portion formed integrally therewith and configured to be held in the cradle.

* * * * *